United States Patent [19]

Tschan

[11] Patent Number: 5,016,938
[45] Date of Patent: May 21, 1991

[54] SUN VISOR WITH EXTENSIBLE PANEL

[76] Inventor: Grace J. Tschan, 587 N. Portland Blvd., #4, Portland, Oreg. 97217

[21] Appl. No.: 545,904

[22] Filed: Jun. 29, 1990

[51] Int. Cl.⁵ .............................................. B60J 3/02
[52] U.S. Cl. .................................................. 296/97.8
[58] Field of Search .............................. 296/97.8, 97.4

[56] References Cited

U.S. PATENT DOCUMENTS

| | | | |
|---|---|---|---|
| 2,134,414 | 10/1938 | Norcross | 296/97.8 |
| 2,228,209 | 1/1941 | Harrington | 296/97 |
| 2,385,557 | 9/1945 | Ward | 296/97 |
| 2,422,863 | 6/1947 | Stroth | 296/97 |
| 2,596,873 | 5/1952 | Solmes | 296/97 |
| 2,733,763 | 2/1956 | Nygaard | 160/32 |
| 4,690,451 | 9/1987 | Killar | 296/97.8 |

Primary Examiner—Robert R. Song
Attorney, Agent, or Firm—Chernoff, Vilhauer, McClung & Stenzel

[57] ABSTRACT

A sun visor having an extensible panel which is received within the main visor body. The main panel includes an elongate slot having a plurality of opposed notches spaced therealong, the slot communicating with a cavity in the main panel. The extensible panel includes a detent mechanism including a pair of biased pins slidable in a track. The pins extend through the slot in the main panel and engage the notches in the slot. The pins may be squeezed together to enable the extensible panel to be moved with respect to the main panel.

12 Claims, 1 Drawing Sheet

SUN VISOR WITH EXTENSIBLE PANEL

FIELD OF THE INVENTION

This invention relates to a sun visor and particularly to a sun visor having an extensible tinted panel which may be adjusted to suit the individual.

BACKGROUND OF THE INVENTION

Automobiles are typically equipped with sun visors in the front passenger compartment. The purpose of a sun visor is to block sunlight from shining in a passenger's eyes. A typical sun visor is an opaque flat panel, which may be stored in an "up" position, flat against the automobile's ceiling and above the passenger's line of view through the front windshield. When needed, the sun visor may be rotated down to shield the passenger's eyes from the sun. The typical visor presents problems to persons of shorter than average height because sunlight can pass below the visor and strike the person's eyes making it difficult to safely see straight ahead when driving towards the sun.

Others have devised sun visors having extensible tinted panels. Applicant is aware of Harrington, U.S. Pat. No. 2,228,209; Ward, U.S. Pat. No. 2,385,557; Stroth, U.S. Pat. No. 2,422,863; Solmes, U.S. Pat. No. 2,596,873; and Nygaard, U.S. Pat. No. 2,733,763. For the most part, these visor's employ a frictional engagement between the main sun visor panel and the extensible tinted panel. A frictional engagement has several drawbacks. If the frictional engagement is too strong, operations of the extensible panel can be difficult, especially if it is being attempted with one hand while operating the motor vehicle with the other hand. Alternatively, if the frictional engagement is too weak, vibration caused by a rough roadway can overcome the frictional engagement between the extensible tinted panel and the main visor panel, enabling the extensible panel to slip.

SUMMARY OF THE INVENTION

The sun visor of the present invention provides for positive locking engagement between the extensible panel and the main visor body, yet the extensible panel may be operated with one hand while operating a motor vehicle with the other hand.

The sun visor of the present invention includes two panels, a main panel and an extensible panel. The extensible panel is held parallel to the main panel and can slide relative to the main panel in a plane parallel to the main panel. The main panel includes an elongate slot having a plurality of notches spaced therealong. The slot is arranged parallel to an axis of movement defined by the extensible panel sliding with respect to the main panel. The extensible panel is equipped with a detent mechanism which extends through the slot in the main panel. The detent mechanism is adapted to selectively engage the notches of the slot and hold the extensible panel in a selected position.

It is a principal object of the invention to provide a sun visor with an extensible panel that may be fixed into various selected positions by a manually operated detent mechanism.

It is an associated object to provide such a sun visor having a tinted, transparent portion which can be extended from an opaque portion of the sun visor.

It is an associated object to provide such a sun visor in which the extensible panel may be adjusted by manually actuating a spring-loaded mechanism.

It is a related object of the present invention to provide a sun visor having an extensible panel which does not rely upon frictional engagement between the extensible panel and the main visor body.

It is a further object of the present invention to provide such a sun visor having a detent mechanism which may be operated with one hand.

It is a further object to provide such a visor having a detent mechanism which positively locks the extensible panel in place with respect to the main panel.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
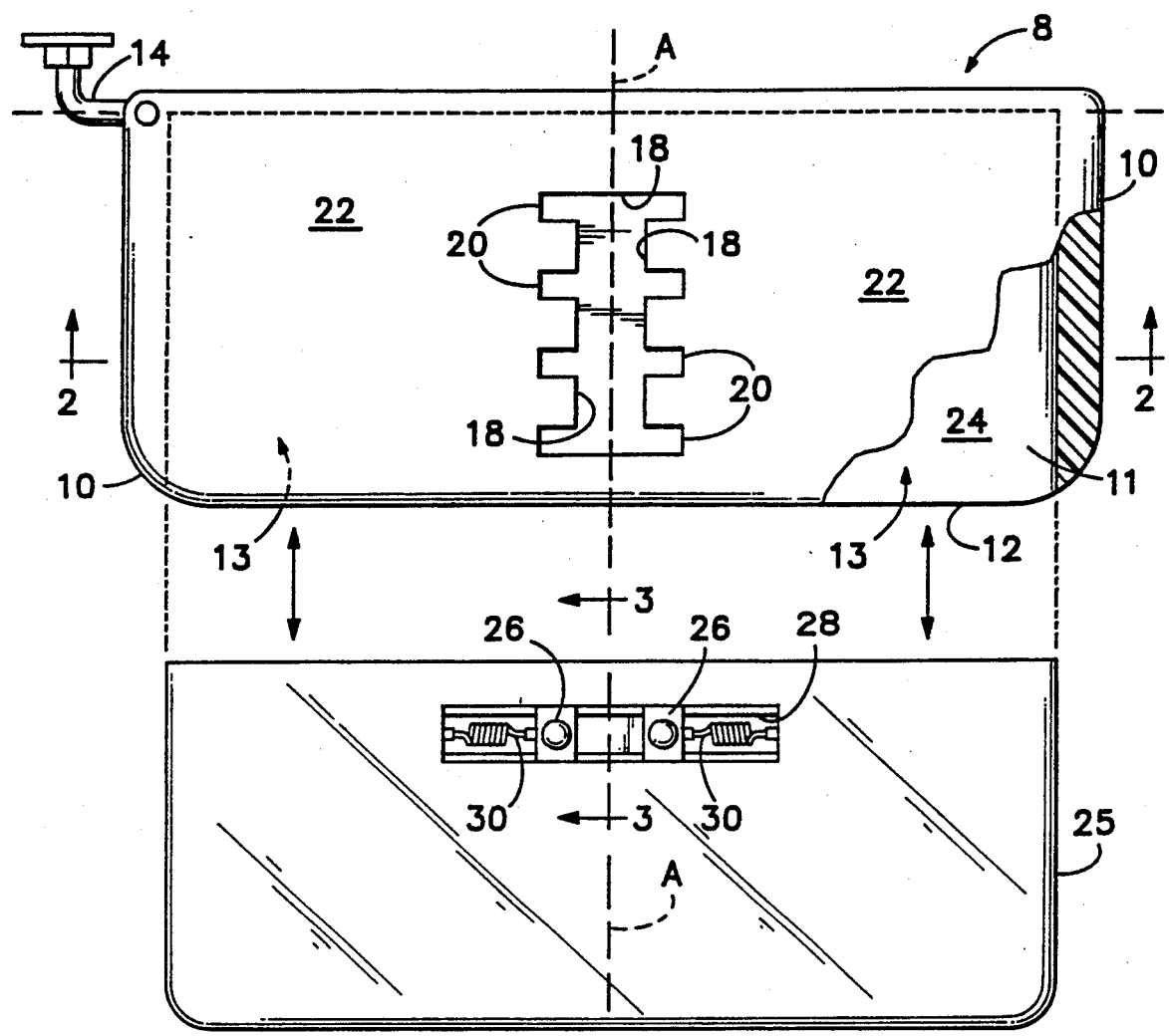
FIG. 1 is an expanded plan view of the sun visor with a portion of the main visor panel cut away.
Figure 2:
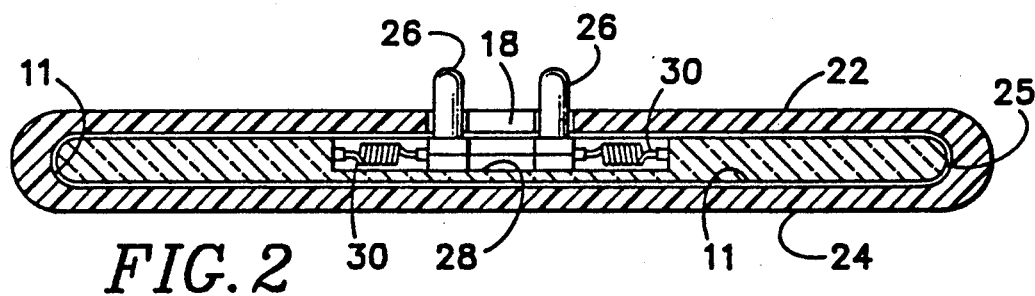
FIG. 2 is a cross section view of the sun visor assembly, as taken along line 2—2 of FIG. 1, as seen when the sun visor is assembled.

An exemplary sun visor of the present invention is shown in FIGS. 1 and 2. The sun visor assembly 8 includes an elongate planar main visor panel 10 and an elongate planar extensible panel 25. The main panel is typically attached to an automobile's ceiling by a bracket arm 14.

The main visor panel 10 of the exemplary embodiment is hollow, having a cavity 11 open at a lower longitudinal margin 12. The cavity is defined by a pair of parallel, opposed plates, an upper plate 22 and a lower plate 24, which together comprise the main visor. The upper and lower plates further define an open mouth 13 along the lower longitudinal margin 12 of the main panel. The main panel includes an elongate slot 18 having a plurality of notches 20 spaced therealong. As shown in FIG. 2 the slot 18 creates an elongate opening through the upper plate 22 into the cavity and having a longitudinal direction that is transverse to the longitudinal direction of the main panel.

Figure 3:
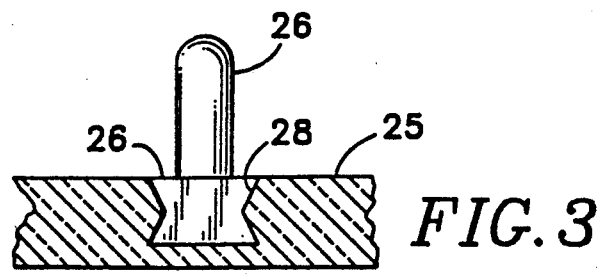
FIG. 3 is a partial cross section of the sun visor taken along line 3—3 of FIG. 1.

The extensible panel 25 may be either tinted or opaque. The extensible panel includes an elongate track 28 and a pair of pins' ≈ which are slidably received in the track 28. The pins are biased away from each other and towards their respective ends of the track by a pair of biasing springs 30. As shown in FIGS. 2 and 3, the pins protrude perpendicularly out of a plane defined by the extensible panel. As shown in FIG. 3, the pins 26 are retained in the track 28 by the mating hourglass-shape of the pins and track.

In the exemplary embodiment the extensible panel 25 is received within the cavity 11 of the main panel 10. The extensible panel may be fully seated within the main panel such that none of the extensible panel is exposed. The pins 26 protrude through the slot 18 in the main panel and engage a pair of opposed notches. The pins are biased into the notches by the biasing springs 30. As may be seen in FIG. 1, the track 28 is arranged perpendicular to the elongate slot of the main panel so that the movement of the pins within the track is transverse to the longitudinal direction of the slot.

The sun visor assembly 8 may be stored in a position against the ceiling of the automobile and above the passenger's line of view through the automobile's windshield. When the sun visor is needed to shield the passenger's eyes from the sun, the sun visor assembly may be rotated about a horizontal axis defined by the bracket arm 14 into a substantially vertical position as shown in FIG. 1. In this orientation, the extensible panel may be extended from the main panel by squeezing the pins 26 together against the biasing pressure of the springs 30. When the pins are drawn together, they are disengaged from the notches in the slot and the extensible panel is free to move with respect to the main panel along axis A, in a direction parallel to the slot. When the pins are released, the biasing springs will pull the pins away from each other and into a pair of opposed notches, thus locking the extensible panel into the desired position.

Note that operation of the extensible panel may be readily accomplished with one hand, while using the other hand to operate the motor vehicle. Employing a pair of pins 26 which are to be squeezed together provides a counterforce arrangement wherein the thumb and forefinger of one hand may be used to squeeze the pins together—resulting in complete resolution of the forces within the detent mechanism.

Compare this arrangement with one involving frictional engagement between the two panels. The prior art extensible visors cited herein generally use frictional engagement between the panels along two parallel spaced-apart margins. When operating these extensible visors with one hand, it is important that the application of force be midway between the engaged margins. Otherwise, the panels will become misaligned and not slide with respect to each other.

Another problem with the prior art "frictional engagement" panels is the alignment of the counterforce means. As pointed out above, sun visors are typically supported by a bracket arm 14 attached to one corner of the visor. Any force applied to the extensible panels of the prior art in order to slide them with respect to the main panel must be resisted by the bracket arm, which is arranged off-axis to the initial force. This misalignment of forces can contribute to problems in the operation of frictional engagement-type visor assemblies.

It should also be noted that the detent system of the present invention provides for positive locking engagement between the panels which is not likely to slip or be overcome by vibration or jarring.

The device shown and described herein is exemplary and applicant is aware that other configurations, apart from that shown herein could accomplish the invention. For example, FIGS. 2 and 3 show a track 28 embedded in the extensible panel 25. It is also contemplated that a track mounted upon the surface of the extensible panel would fulfill the objects of the invention. Of course, other arrangements are also available to retain the pins 26 in the track 28. Similarly, it is not strictly necessary for the main visor panel 12 to form a cavity to receive the extensible panel. Although the exemplary embodiment has been shown with the main panel and the extensible panel coplanar, a parallel, superimposed arrangement is within the scope of the invention.

It is further understood that a detent mechanism of another configuration may accomplish the invention and that the precise arrangement of springs and pins is not strictly necessary.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow

What is claimed is:

1. A sun visor, comprising:
   (a) a substantially planar first panel defining an elongate slot having a plurality of notches spaced therealong;
   (b) a substantially planar second panel;
   (c) means for holding said second panel in a plane parallel to said first panel and for allowing said second panel to slidably move along a first axis within a range of positions between a first position where said first and second panels substantially overlap one another and a second position where said second panel projects beyond said first panel; and
   (d) detent means, attached to said second panel and projecting substantially perpendicularly from a plane defined by said second panel and through said elongate slot, for engaging with one of said plurality of notches to hold said second panel in a selected position within said range of positions, and further including means for biasing said detent means into one of said plurality of notches.

2. The sunvisor of claim 1, wherein said second panel is constructed of a tinted, transparent material.

3. The sun visor of claim 1, wherein said elongate slot is arranged substantially parallel to said first axis.

4. The sun visor of claim 3, wherein said detent means includes resiliently biased means for selectively engaging one of said notches in said elongate slot, said resiliently biased means selectively movable in a direction substantially perpendicular to said slot, said notches adapted to receive said resiliently biased means.

5. The sun visor of claim 1 wherein said detent means includes a pair of force-receiving means, and alignment means for resolving the forces applied to said force-receiving means within said detent means.

6. The sun visor of claim 5 wherein said force receiving means includes a pair of oppositely biased pins.

7. The sun visor of claim 5 wherein said alignment means includes an elongate linear track.

8. A sun visor, comprising;
   (a) a substantially planar first panel having a bottom margin and a pair of parallel, opposed first and second plates defining a hollow interior open to said bottom margin, said first plate defining an elongate slot having a plurality of notches spaced therealong, said elongate slot in communication with said hollow interior;
   (b) a substantially planar second panel slidably received within said hollow interior of said first panel, said second panel slidably moveable within said hollow interior along a first axis;
   (c) a track attached to said second panel;
   (d) a first pin slidably mounted in said track such that said first pin extends through said elongate slot; and
   (e) first actuating means for biasing said first pin into engagement with one of said plurality of notches 9. The sun visor of claim 8, further including a second pin slidably mounted in said track, and second actuating means for biasing said second pin into engagement with another one of said plurality of notches.

10. The sun visor of claim 8, wherein said second panel is constructed of a tinted, transparent material.

11. The sun visor of claim 8, wherein said elongate slot has a long axis substantially parallel to said first axis.

12. The sun visor of claim 11, where said first pin is slidable in a direction substantially perpendicular to said first axis.

* * * * *

UNITED STATES PATENT AND TRADEMARK OFFICE
CERTIFICATE OF CORRECTION

PATENT NO. : 5,016,938
DATED : May 21, 1991
INVENTOR(S) : Grace J. Tschan

It is certified that error appears in the above—identified patent and that said Letters Patent is hereby corrected as shown below:

Col. 2, line 52:  After "pins" delete --'≈--

Signed and Sealed this

Tenth Day of August, 1993

Attest:

MICHAEL K. KIRK

Attesting Officer

Acting Commissioner of Patents and Trademarks